United States Patent
Cingoz

(10) Patent No.: US 12,368,174 B2
(45) Date of Patent: Jul. 22, 2025

(54) FUEL CELL POWER PLANT CONTROL TO PREVENT REACTANT STARVATION DURING ISLANDED MODE OF OPERATION

(71) Applicant: DOOSAN FUEL CELL AMERICA, INC., South Windsor, CT (US)

(72) Inventor: Fatih Cingoz, East Hartford, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 1444 days.

(21) Appl. No.: 16/595,783

(22) Filed: Oct. 8, 2019

(65) Prior Publication Data

US 2021/0104763 A1    Apr. 8, 2021

(51) Int. Cl.
*H01M 8/04992*    (2016.01)
*H01M 8/04858*    (2016.01)

(52) U.S. Cl.
CPC ... *H01M 8/04992* (2013.01); *H01M 8/04932* (2013.01)

(58) Field of Classification Search
CPC .......... H01M 8/04298–04313; H01M 8/04537–04686; H01M 8/04694; H01M 8/04858–04953; H01M 8/04992
See application file for complete search history.

(56) References Cited

U.S. PATENT DOCUMENTS

2011/0248569 A1* 10/2011 Son .............. H02J 3/381
                                  307/87
2019/0305346 A1* 10/2019 Berntsen ............ H02J 3/38

* cited by examiner

*Primary Examiner* — Nicole M. Buie-Hatcher
*Assistant Examiner* — Jacob Buchanan
(74) *Attorney, Agent, or Firm* — Carlson, Gaskey & Olds, P.C.

(57) ABSTRACT

An illustrative example controller for a fuel cell power plant includes at least one processor and memory associated with the processor. The processor is configured to control operation of the fuel cell power plant during an islanded mode of operation wherein the fuel cell power plant provides output power to a load. The processor is configured to control the operation of the fuel cell power plant in the islanded mode by adjusting a droop gain of the controller to change the output power of the fuel cell power plant in response to a change in demand from the load. While adjusting the droop gain, the processor is configured to maintain a portion of the demand from the load met by the output power of the fuel cell power plant within a predetermined allocation of islanded mode load sharing assigned to the fuel cell power plant, maintain a ramp up rate of the output power of the fuel cell power plant within a predetermined maximum ramp up capability of the fuel cell power plant, and maintain a frequency of the output power of the fuel cell power plant within a predetermined range.

19 Claims, 3 Drawing Sheets

FUEL CELL POWER PLANT CONTROL TO PREVENT REACTANT STARVATION DURING ISLANDED MODE OF OPERATION

BACKGROUND

Fuel cells generate electricity based on an electrochemical reaction. Fuel cell power plants typically include many fuel cells arranged in stacks referred to as cell stack assemblies. Fuel cell power plants may be integrated into microgrid systems to supply power in combination with a utility company main grid. There are situations in which the main grid is unavailable and the microgrid operates in a so-called islanded mode as the primary source of electrical power. There are various challenges associated with operating a fuel cell power plant in an islanded mode.

One such challenge is providing sufficient reactant flow to the cell stack assembly to avoid reactant starvation during load changes where additional power output may be required from the power plant. The response time of the fuel cell power plant power converters to a load change is nearly instantaneous, whereas the response time of reactant flow typically is not fast enough to satisfy the increase in load demand The delay in reactant flow change may lead to reactant starvation, which can pose serious operating issues. While a variety of fuel cell power plant control methods have been proposed, none has effectively addressed this concern.

SUMMARY

An illustrative example controller for a fuel cell power plant includes at least one processor and memory associated with the processor. The processor is configured to control operation of the fuel cell power plant during an islanded mode of operation wherein the fuel cell power plant provides output power to a load. The processor is configured to control the operation of the fuel cell power plant in the islanded mode by adjusting a droop gain of the controller to change the output power of the fuel cell power plant in response to a change in demand from the load. While adjusting the droop gain, the processor is configured to maintain a portion of the demand from the load met by the output power of the fuel cell power plant within a predetermined allocation of islanded mode load sharing assigned to the fuel cell power plant, maintain a ramp up rate of the output power of the fuel cell power plant within a predetermined maximum ramp up capability of the fuel cell power plant, and maintain a frequency of the fuel cell power plant within a predetermined range.

In an example embodiment having one or more features of the controller of the previous paragraph, the processor is configured to control a rate at which the droop gain changes to maintain stability of the fuel cell power plant.

In an example embodiment having one or more features of the controller of any of the previous paragraphs, the processor includes a filter that controls the rate at which the droop gain changes.

In an example embodiment having one or more features of the controller of any of the previous paragraphs, the filter prevents a change in the droop gain during a predetermined time lag in response to the change in the load demand.

In an example embodiment having one or more features of the controller of any of the previous paragraphs, the processor is configured to determine a droop gain adjustment factor for adjusting the droop gain to maintain the portion of the demand from the load met by the output power of the fuel cell power plant within the predetermined allocation; and the processor is configured to determine the droop gain adjustment factor by determining an instantaneous ramp up rate of the output power of the fuel cell power plant, and setting the droop gain adjustment factor equal to: (the instantaneous ramp up rate)×(a predetermined frequency droop gain)/(a predetermined maximum ramp up rate of the output power of the fuel cell power plant).

In an example embodiment having one or more features of the controller of any of the previous paragraphs, the processor is configured to determine the instantaneous ramp up rate by determining a derivative of the current output power.

In an example embodiment having one or more features of the controller of any of the previous paragraphs, the determined derivative is zero during a steady state condition of the demand of the load and the processor applies the predetermined fixed frequency droop gain during the steady state condition of the demand of the load.

In an example embodiment having one or more features of the controller of any of the previous paragraphs, the processor is configured to maintain the ramp up rate of the output power of the fuel cell power plant within the predetermined maximum ramp up capability of the fuel cell power plant by determining an instantaneous ramp up rate of the output power of the fuel cell power plant and adjusting the droop gain by a droop gain adjustment factor when the instantaneous ramp up rate is less than the maximum ramp up capability or setting the droop gain adjustment factor to zero when the instantaneous ramp up rate exceeds the maximum ramp up capability.

In an example embodiment having one or more features of the controller of any of the previous paragraphs, the processor is configured to maintain the frequency of the output power of the fuel cell power plant within the predetermined range by setting a maximum droop gain adjustment factor to be equal to: (a predetermined maximum frequency droop)/(a current output power of the fuel cell power plant)−(a predetermined fixed frequency droop gain) and adjusting the droop gain using a droop gain adjustment factor that is less than or equal to the maximum droop gain adjustment factor.

An illustrative example embodiment of a fuel cell power plant includes at least one cell stack assembly including a plurality of fuel cells and the controller of any of the previous paragraphs.

An illustrative example method of controlling a fuel cell power plant includes determining that the fuel cell power plant is operating in an islanded mode wherein the fuel cell power plant provides output power to a load and adjusting a droop gain to change an output power of the fuel cell power plant in response to a change in demand from the load while: maintaining a portion of the demand from the load met by the output power of the fuel cell power plant within a predetermined allocation of islanded mode load sharing assigned to the fuel cell power plant, maintaining a ramp up rate of the output power of the fuel cell power plant within a predetermined maximum ramp up capability of the fuel cell power plant, and maintaining a frequency of the output power of the fuel cell power plant within a predetermined range.

An example embodiment having one or more features of the method of the previous paragraph includes controlling a rate at which the droop gain changes to maintain stability of the fuel cell power plant.

An example embodiment having one or more features of the method of any of the previous paragraphs includes using a filter that controls the rate at which the droop gain changes.

In an example embodiment having one or more features of the method of any of the previous paragraphs, the filter prevents a change in the droop gain during a predetermined time lag in response to the change in the load demand An example embodiment having one or more features of the method of any of the previous paragraphs includes determining a droop gain adjustment factor for adjusting the droop gain for maintaining the portion of the demand from the load met by the output power of the fuel cell power plant within the predetermined allocation and determining the droop gain adjustment factor by determining an instantaneous ramp up rate of the output power of the fuel cell power plant and setting the droop gain adjustment factor equal to: (the instantaneous ramp up rate)×(a predetermined frequency droop gain)/(a predetermined maximum ramp up rate of the output power of the fuel cell power plant).

An example embodiment having one or more features of the method of any of the previous paragraphs includes determining the instantaneous ramp up rate by determining a derivative of the current output power.

In an example embodiment having one or more features of the method of any of the previous paragraphs, the determined derivative is zero during a steady state condition of the demand of the load and the method comprises applying the predetermined fixed frequency droop gain during the steady state condition of the demand of the load.

In an example embodiment having one or more features of the method of any of the previous paragraphs, maintaining the ramp up rate of the output power of the fuel cell power plant within the predetermined maximum ramp up capability of the fuel cell power plant comprises determining an instantaneous ramp up rate of the output power of the fuel cell power plant and adjusting the droop gain by a droop gain adjustment factor when the instantaneous ramp up rate is less than the maximum ramp up capability or setting the droop gain adjustment factor to zero when the instantaneous ramp up rate exceeds the maximum ramp up capability.

In an example embodiment having one or more features of the method of any of the previous paragraphs, maintaining the frequency of the output power of the fuel cell power plant within the predetermined range comprises setting a maximum droop gain adjustment factor to be equal to: (a predetermined maximum frequency droop)/(a current output power of the fuel cell power plant)−(a predetermined fixed frequency droop gain) and adjusting the droop gain using a droop gain adjustment factor that is less than or equal to the maximum droop gain adjustment factor.

Various features and advantages of at least one disclosed example embodiment will become apparent to those skilled in the art from the following detailed description. The drawings that accompany the detailed description can be briefly described as follows.

DETAILED DESCRIPTION

Figure 1:
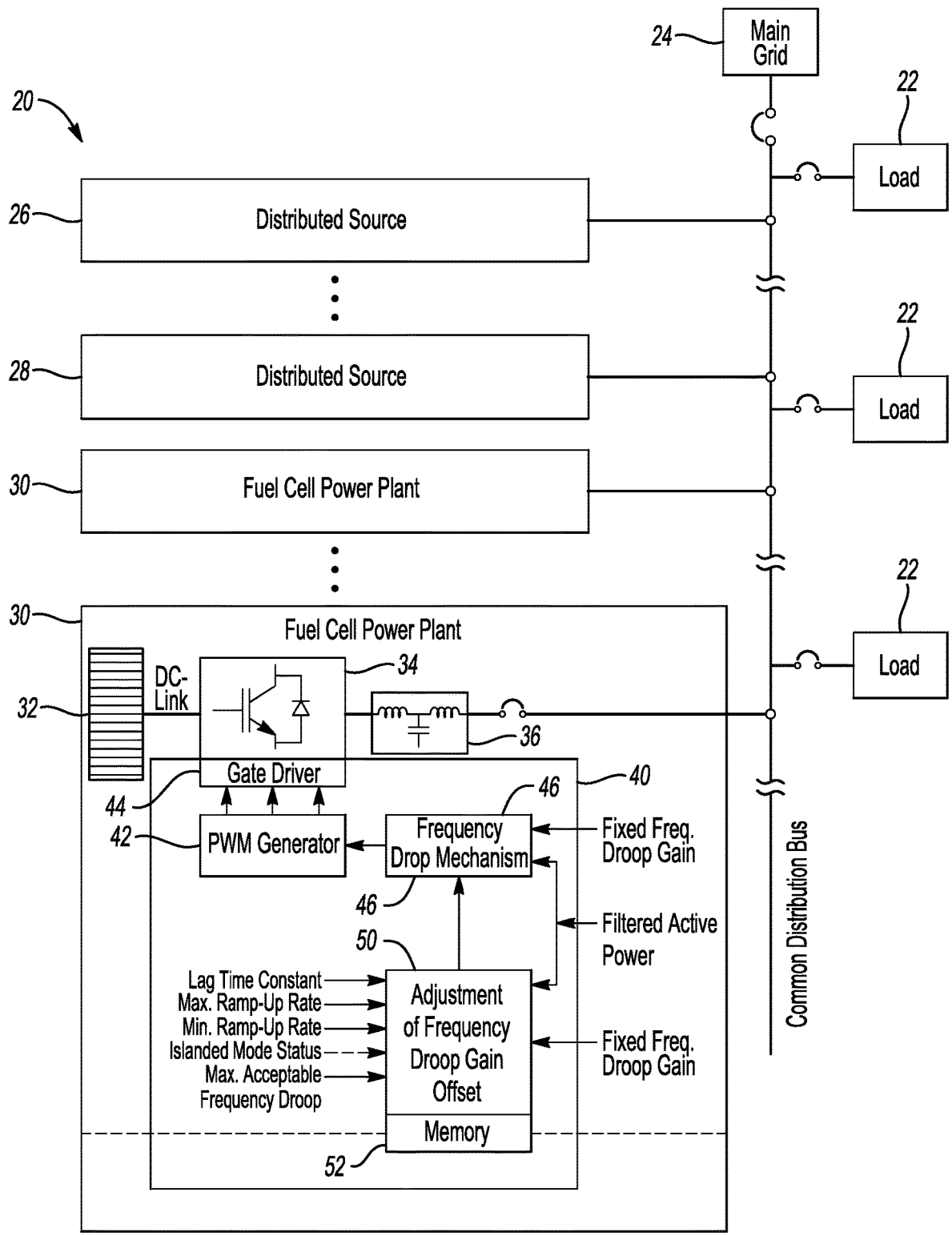
FIG. 1 schematically illustrates selected portions of a power system including fuel cell power plants that have a controller designed according to an example embodiment.

FIG. 1 schematically illustrates selected portions of a power distribution system 20 that provides electrical power to at least one load 22. The system 20 includes a main grid 24, which is a power supply provided by a utility company. Additional power sources 26 and 28 and fuel cell power plants 30 provide power to the load 22. The cluster of power sources 26 and 28 and the fuel cell power plants 30 may be regarded as a microgrid that supplements power provided by the main grid 24 under various circumstances. When the main grid 24 is unavailable, the fuel cell power plants 30 and the power sources 26 and 28 operate in an islanded mode in which all of the power required by the load 22, to the extent possible, is provided by the fuel cell power plants 30 and the power sources 26 and 28 without any contribution from the main grid 24 to meet the demand of the load 22.

Each fuel cell power plant 30 includes a cell stack assembly 32 that includes a plurality of fuel cells for generating electrical power. Grid interface components 34 and 36 are configured to operate in a known manner so that the electrical power output from the cell stack assembly 32 may be supplied to the load 22. Each of the fuel cell power plants 30 is allocated a portion of the demand of the load 22. The allocated portions of the load take into account the power output capabilities of each fuel cell power plant 30.

Each of the fuel cell power plants 30 includes a controller 40 that is configured to control the output power of the fuel cell power plant 30 during the islanded mode of operation. The controller 40 includes a pulse width modulation generator 42, a gate driver 44 and a frequency droop mechanism module 46. The controller 40 also includes a processor 50 and memory 52 associated with the processor 50. The processor is configured to control operation of the fuel cell power plant 30 in the islanded mode by adjusting a droop gain of the controller 40 to change the output power of the fuel cell power plant 30 in response to a change in demand from the load 22. As schematically shown in FIG. 1, the processor 50 receives information, such as a time lag constant, a maximum ramp up rate capability of the fuel cell power plant 30, a minimum ramp up rate, an indicator whether the fuel cell power plant 30 is operating in the islanded mode based on availability of the main grid 24, a maximum allowable frequency droop, a predetermined fixed frequency droop gain, and an indication of the current output power of the fuel cell power plant 30.

Figure 2:
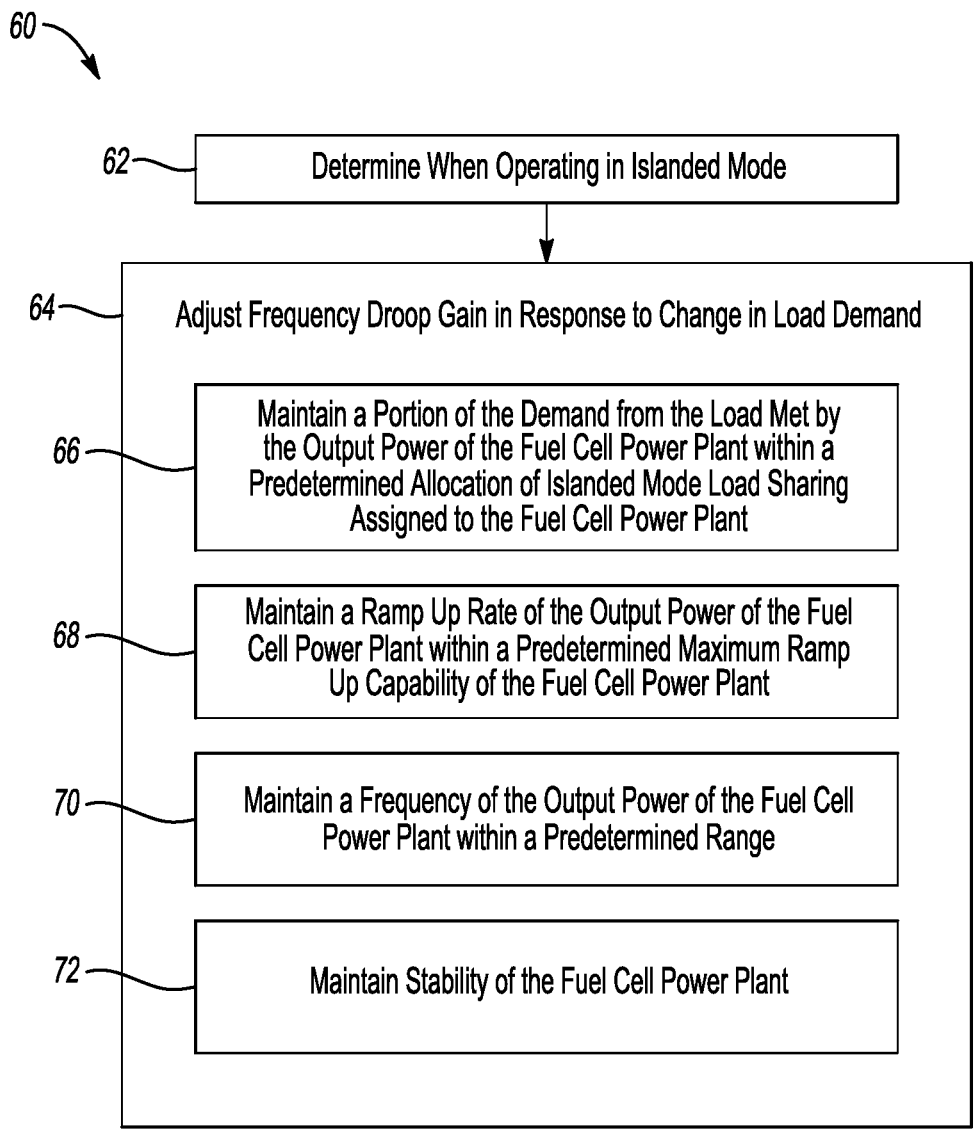
FIG. 2 is a flow chart diagram summarizing an example control strategy.

As summarized in the flowchart diagram 60 of FIG. 2, the processor 50 controls the droop gain of the controller 40 to control the output power of the fuel cell power plant 30. At 62, the processor 50 determines that the fuel cell power plant 30 is operating in the islanded mode. At 64, the processor 50 adjusts a frequency droop gain in response to a change in the demand of the load 22. While adjusting the frequency droop gain, the processor 50 maintains a portion of the demand from the load 22 that is met by the output power of the fuel cell power plant 30 within a predetermined allocation of islanded mode load sharing assigned to that fuel cell power plant at 66. At 68, while adjusting the frequency droop gain, the processor 50 also maintains a ramp up rate of the output power of the fuel cell power plant 30 within a predetermined maximum ramp up capability of the fuel cell power plant 30. At 70, the processor 50 maintains a frequency of the output power of the fuel cell power plant 30 within a predetermined range. The processor 50 also maintains stability of the fuel cell power plant 30 at 72.

By performing the functions summarized in FIG. 2 while adjusting the frequency droop gain in response to changes in the demand of the load 22 while operating in the islanded mode, the processor 50 protects against reactant starvation of the cell stack assembly 32. The various protective mechanisms and techniques utilized by the processor 50 control the output power of the fuel cell power plant 30 in a manner that allows for operating in the islanded mode while protecting the components of the fuel cells of the cell stack assembly 32 from damage or performance degradation while addressing the load demand required of the microgrid portion of the power distribution system 20.

Figure 3:
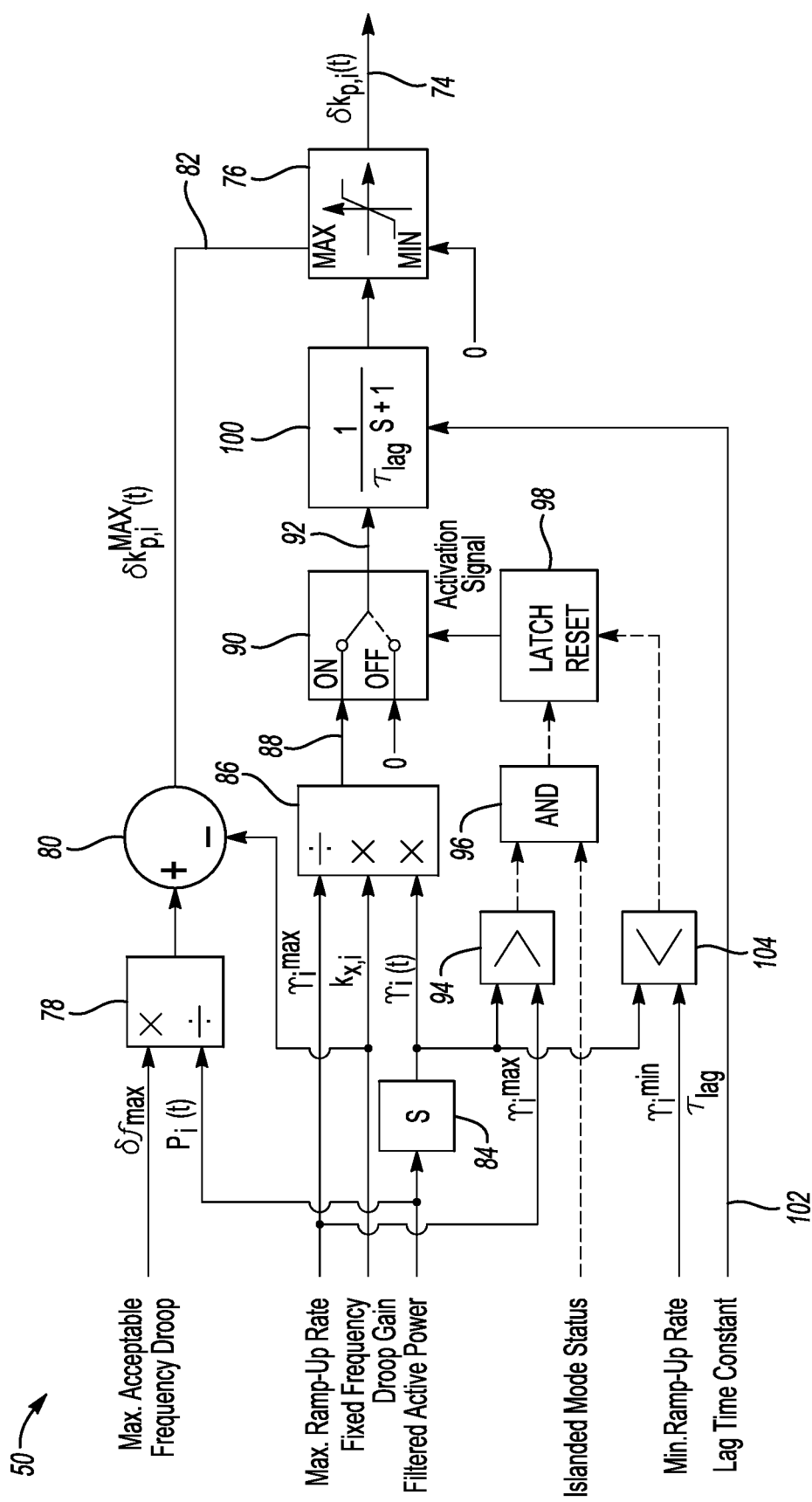
FIG. 3 schematically illustrates an example embodiment of a controller designed according to an example embodiment.

FIG. 3 schematically illustrates an example embodiment of the processor 50. The processor 50 provides a droop gain adjustment factor ($\delta k_{p,i}(t)$) output at 74. The processor 50 maintains the frequency of the output power of the fuel cell power plant 30 within a predetermined range using a limiter module 76 that places limits on the droop gain adjustment factor output at 74. In the illustrated example, the processor 50 accomplishes this by using a predetermined maximum acceptable frequency droop value ($\delta k_{max}$) that is based on characteristics of the fuel cell power plant 30. Given this description, those skilled in the art will be able to determine what an appropriate maximum acceptable frequency droop value would be for a particular power plant installation. The processor 50 uses the maximum acceptable frequency droop value ($\delta k_{max}$) and a filtered active power indication ($P_i(t)$) that is based on the current output power of the fuel cell power plant 30. A divider module 78 divides the maximum acceptable frequency droop value by the current output power. A subtraction module 80 subtracts a predetermined fixed frequency droop gain of the controller 40 ($k_{x,i}$) from the output of the divider module 78. The result at 82 is the maximum allowable droop gain adjustment factor that sets the upper limit of the limiter module 76.

In the illustrated example, the result at 82 is determined using the following relationship:

$$\delta k_{p,i}^{max}(t) = \delta k_{max}/P_i(t) - k_{x,i}$$

where $\delta k_{p,i}^{max}(t)$ is the maximum allowable droop gain adjustment factor and the other parameters are defined in the preceding paragraph.

Using this approach for setting the maximum allowable droop gain adjustment factor accommodates different amounts of change depending on the current operating conditions of the fuel cell power plant 30. The output of the divider module 78 decreases as the output power increases, which results in a lower maximum acceptable droop gain adjustment factor value at 82. The processor 50 allows for larger changes in the droop gain when the output power of the fuel cell power plant 30 is relatively lower and smaller changes when the output power is relatively high. By limiting the frequency droop gain adjustment factor in this manner, the processor 50 maintains the frequency of the power plant 30 within a desired range. In the illustrated example, the minimum for the output at 74 is set to zero, which is useful during steady state conditions when there are no changes in the demand from the load 22.

The processor 50 also maintains the portion of the demand from the load 22 that is met by the output power of the fuel cell power plant 30 within the predetermined allocation of islanded mode load sharing assigned to that fuel cell power plant by determining the droop gain adjustment factor ($\delta k_{p,i}(t)$) output at 74 utilizing a predetermined maximum ramp up rate capability ($\gamma_i^{max}$) of the fuel cell power plant 30, the predetermined fixed frequency droop gain value ($k_{x,i}$) and the current output power of the fuel cell power plant 30. A derivative module 84 takes a derivative of the filtered active power indication ($P_i(t)$) corresponding to the current output power of the fuel cell power plant 30 to determine an instantaneous ramp up rate ($\gamma_i(t)$) of the output power. A multiplier 86 determines the droop gain adjustment factor ($\delta k_{p,i}(t)$) by multiplying the instantaneous ramp up rate by the predetermined fixed frequency droop gain value and dividing that by the predetermined maximum ramp up rate, which can be expressed using the following equation:

$$\delta k_{p,i}(t) = k_{x,i} * \gamma_i(t)/\gamma_i^{max}$$

The output at 88 is the resulting droop gain adjustment factor ($\delta k_{p,i}(t)$).

A switch control 90 has an output 92 that is either the droop gain adjustment factor at 88 or zero. The output from the switch control 90 in this example is based upon the processor 50 maintaining the ramp up rate of the output power of the fuel cell power plant 30 within the predetermined maximum ramp up capability of the fuel cell power plant 30. The droop gain adjustment factor can be increased so that the active power contribution of the fuel cell power plant 30 into the microgrid network will decrease and maintain the ramp up rate below a maximum allowable ramp up rate. The droop gain adjustment factor will increase only during transients and return to a fixed value at steady state to maintain proportional sharing among the microgrid sources.

In the illustrated example embodiment, a comparator 94 determines whether the instantaneous ramp up rate output by the derivative module 84 is less than the maximum ramp up capability. When the instantaneous ramp up rate is higher than the maximum ramp up capability and the fuel cell power plant 30 is operating in the islanded mode, an output from an AND gate 96 enables a latch 98 to provide an activation signal to the switch control 90 so that the output at 92 is set to the droop gain adjustment factor at 88. The activation signal will not be released until the latch 98 is reset.

If the instantaneous ramp up rate is less than the maximum ramp up capability at 94 or if the fuel cell power plant 30 is not currently operating in the islanded mode, then the AND gate 96 will not trigger the latch 98 and the output at 92 stays at zero. In this manner, the processor 50 maintains the ramp up rate of the output power within the maximum ramp up capability of the fuel cell power plant 30.

The illustrated example processor 50 also maintains system stability by introducing a time lag between a change in the load demand and the time at which the droop gain adjustment factor is output at 74. In this example, a first order filter 100 avoids the effect of any sudden changes in the droop gain of the controller 40 by including a time lag before a droop gain adjustment is applied. The first order filter in this example avoids sudden changes or toggling back and forth if the instantaneous ramp up rate is hovering around the maximum ramp up capability of the fuel cell power plant 30. In this example, the time lag may be adjusted by changing the lag time constant shown at 102. As the lag time constant approaches zero, the filter 100 has less of an effect. Similarly, as the time lag constant increases, the amount of filtering or delay increases, which slows down the rate at which the droop gain may be adjusted.

The illustrated example embodiment of the processor 50 includes a control for resetting the switch control 90. A comparator 104 determines whether the instantaneous ramp up rate is less than a predetermined minimum ramp up rate. When the instantaneous ramp up rate falls below the minimum, the comparator 104 provides a reset signal to the latch 98, which responds by switching the output 92 of the switch control 90 to zero.

The illustrated example embodiment protects a fuel cell power plant from reactant starvation during load increases while operating in an islanded mode. The example processor 50 performs proportional load sharing among the participating microgrid power sources, maintains the ramp up of the output power of the fuel cell power plant 30 within the maximum ramp up capability of that power plant, maintains the system frequency within a desired range and ensures stability of the microgrid system.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A controller for a fuel cell power plant, the controller comprising:
    at least one processor and memory associated with the processor, the processor being configured to control operation of the fuel cell power plant during an islanded mode of operation wherein the fuel cell power plant provides output power to a load, the processor being configured to control the operation of the fuel cell power plant in the islanded mode by
    adjusting a droop gain of the controller to change the output power of the fuel cell power plant in response to a change in demand from the load while:
        maintaining a portion of the demand from the load met by the output power of the fuel cell power plant within a predetermined allocation of islanded mode load sharing assigned to the fuel cell power plant,
        maintaining a ramp up rate of the output power of the fuel cell power plant within a predetermined maximum ramp up capability of the fuel cell power plant, and
        maintaining a frequency of the output power of the fuel cell power plant within a predetermined range.

2. The controller of claim 1, wherein the processor is configured to control a rate at which the droop gain changes to maintain stability of the fuel cell power plant.

3. The controller of claim 2, wherein the processor includes a filter that controls the rate at which the droop gain changes.

4. The controller of claim 3, wherein the filter prevents a change in the droop gain during a predetermined time lag in response to the change in the load demand.

5. The controller of claim 1, wherein
    the processor is configured to determine a droop gain adjustment factor for adjusting the droop gain to maintain the portion of the demand from the load met by the output power of the fuel cell power plant within the predetermined allocation; and
    the processor is configured to determine the droop gain adjustment factor by
    determining an instantaneous ramp up rate of the output power of the fuel cell power plant, and
    setting the droop gain adjustment factor equal to: (the instantaneous ramp up rate)×(a predetermined frequency droop gain)/(a predetermined maximum ramp up rate of the output power of the fuel cell power plant).

6. The controller of claim 5, wherein the processor is configured to determine the instantaneous ramp up rate by determining a derivative of the current output power.

7. The controller of claim 6, wherein
    the determined derivative is zero during a steady state condition of the demand of the load; and
    the processor applies the predetermined fixed frequency droop gain during the steady state condition of the demand of the load.

8. The controller of claim 1, wherein the processor is configured to maintain the ramp up rate of the output power of the fuel cell power plant within the predetermined maximum ramp up capability of the fuel cell power plant by
    determining an instantaneous ramp up rate of the output power of the fuel cell power plant; and
    adjusting the droop gain by a droop gain adjustment factor when the instantaneous ramp up rate is greater than the maximum ramp up capability,
    or
    setting the droop gain adjustment factor to zero when the instantaneous ramp up rate is below the maximum ramp up capability.

9. The controller of claim 1, wherein the processor is configured to maintain the frequency of the output power of the fuel cell power plant within the predetermined range by
    setting a maximum droop gain adjustment factor to be equal to: (a predetermined maximum frequency droop)/(a current output power of the fuel cell power plant)−(a predetermined fixed frequency droop gain); and
    adjusting the droop gain using a droop gain adjustment factor that is less than or equal to the maximum droop gain adjustment factor.

10. A fuel cell power plant comprising at least one cell stack assembly including a plurality of fuel cells and the controller of claim 1.

11. A method of controlling a fuel cell power plant, the method comprising:
    determining that the fuel cell power plant is operating in an islanded mode wherein the fuel cell power plant provides output power to a load; and
    adjusting a droop gain to change an output power of the fuel cell power plant in response to a change in demand from the load while:
        maintaining a portion of the demand from the load met by the output power of the fuel cell power plant within a predetermined allocation of islanded mode load sharing assigned to the fuel cell power plant,
        maintaining a ramp up rate of the output power of the fuel cell power plant within a predetermined maximum ramp up capability of the fuel cell power plant, and
        maintaining a frequency of the output power of the fuel cell power plant within a predetermined range.

12. The method of claim 11, comprising controlling a rate at which the droop gain changes to maintain stability of the fuel cell power plant.

13. The method of claim 12, comprising using a filter that controls the rate at which the droop gain changes.

14. The method of claim 13, wherein the filter prevents a change in the droop gain during a predetermined time lag in response to the change in the load demand.

15. The method of claim 11, comprising
    determining a droop gain adjustment factor for adjusting the droop gain for maintaining the portion of the demand from the load met by the output power of the fuel cell power plant within the predetermined allocation; and determining the droop gain adjustment factor by
determining an instantaneous ramp up rate of the output power of the fuel cell power plant, and
setting the droop gain adjustment factor equal to: (the instantaneous ramp up rate)×(a predetermined frequency droop gain)/(a predetermined maximum ramp up rate of the output power of the fuel cell power plant).

16. The method of claim 15, comprising determining the instantaneous ramp up rate by determining a derivative of the current output power.

17. The method of claim 16, wherein
the determined derivative is zero during a steady state condition of the demand of the load; and
the method comprises applying the predetermined fixed frequency droop gain during the steady state condition of the demand of the load.

18. The method of claim 11, wherein maintaining the ramp up rate of the output power of the fuel cell power plant within the predetermined maximum ramp up capability of the fuel cell power plant comprises
determining an instantaneous ramp up rate of the output power of the fuel cell power plant; and
adjusting the droop gain by a droop gain adjustment factor when the instantaneous ramp up rate is less than the maximum ramp up capability
or
setting the droop gain adjustment factor to zero when the instantaneous ramp up rate exceeds the maximum ramp up capability.

19. The method of claim 11, wherein maintaining the frequency of the output power of the fuel cell power plant within the predetermined range comprises
setting a maximum droop gain adjustment factor to be equal to: (a predetermined maximum frequency droop)/(a current output power of the fuel cell power plant)−(a predetermined fixed frequency droop gain); and
adjusting the droop gain using a droop gain adjustment factor that is less than or equal to the maximum droop gain adjustment factor.

\* \* \* \* \*